May 13, 1930.  E. MAUNZ  1,758,547
VEHICLE SIGNAL
Filed Dec. 6, 1929
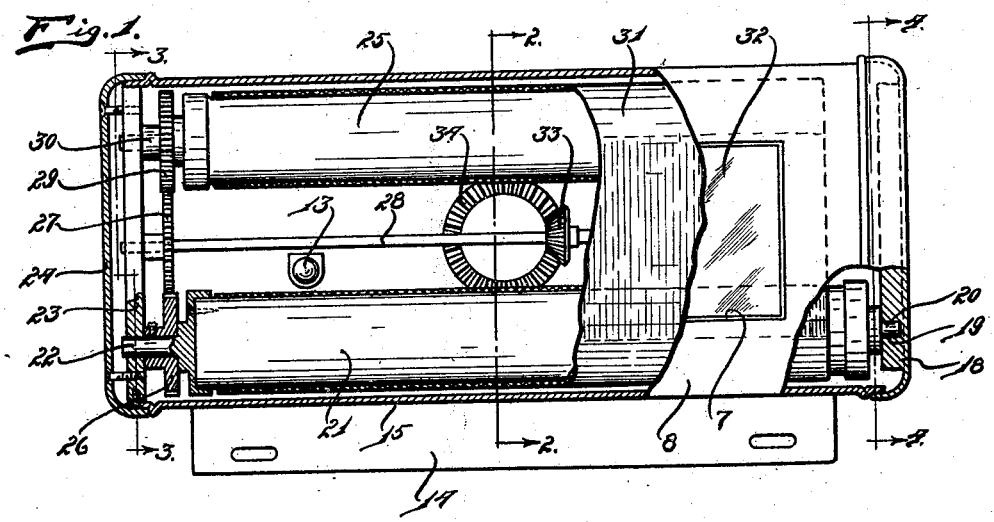
INVENTOR.
Eugene Maunz
BY
Thos. S. Donnelly
ATTORNEY.

Patented May 13, 1930

1,758,547

UNITED STATES PATENT OFFICE

EUGENE MAUNZ, OF DETROIT, MICHIGAN

VEHICLE SIGNAL

Application filed December 6, 1929. Serial No. 412,017.

My invention relates to a new and useful improvement in a vehicle signal adapted for use by the driver of a vehicle to indicate his intention of making a turn of the vehicle. It is an object of the present invention to provide a device of this class which will be simple in structure, economical of manufacture, and highly efficient in use.

Another object of the invention is the provision in a vehicle signal of this class of a pair of co-operating rollers for winding and unwinding a flexible display member to indicate as desired.

It is another object of the present invention to provide a direction signal which will also serve as a tail light and as a license plate illuminator.

Other objects will appear hereinafter.

The invention will be best understood by a reference to the accompanying drawings which form a part of this specification and in which, Fig. 1 is a front elevational view of the invention with parts broken away and parts shown in section.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

In the invention I utilize a housing having an opening 7 formed in the front wall 8, the rear wall 9 being secured to a suitable hollow supporting bracket 10. Extended through the bracket 10 and leading to a socket 11 mounted in the housing is a wire or cable 12 connected to a suitable source of electrical energy for lighting the light bulb 13 which is mounted in the socket 11.

Depending from the rear wall 9 is the license plate holder 14. Formed in the bottom 15 of the housing is an opening 16 closed by the transparent closure 17 so that light from the light bulb 13 may serve to illuminate a license plate mounted on the license plate holder 14.

The end wall 18 of the housing is provided with a socket 19 for the reception of the shaft 20 of a lower roller 21, the opposite end of which is journaled on the trunion 22 extended through the plate 23 attached to the end plate 24. An upper roller 25 is similarly journaled in the housing.

Mounted on the trunion 22 is a gear 26 which meshes with the gear 27 fixedly mounted on the shaft 28. The gear 27 meshes with the gear 29 fixedly mounted on the roller trunion 30. Attached at one end to the roller 25 and at the other end to the roller 21 is a flexible display member 31 on which is carried suitable indicia or display data to indicate through the transparent closure 32 which is positioned over the opening 7 to those observing the signal the intentions of the driver. The display data carried on the flexible member 31 may consist of arrows indicating the direction of the turn, the words, "Right turn" and "Left turn" or such other informative medium as may be selected.

Fixedly mounted on the shaft 28 is a bevel gear 33 which meshes with the bevel gear 34 journaled on the sleeve 35 which is mounted so as to project inwardly of the housing. A sheathing 36 is attached to the member 35 and serves as a covering for the flexible shaft 37 which passes through the member 35 and is fixedly attached to the bevel gear 34.

The shaft 37 may be rotated manually or in any other desired manner and when the driver of the vehicle desires to make a turn, the shaft 37 will be rotated in the proper direction so as to rotate the roller 21 and 25 to the position at which the lettering or display on the flexible member 31 will be in registration with the closure 32. The light bulb 13 will, of course, when necessary, be lit so that the signal may be used at night and in the day time.

This display data is so located on the flexible member 31 that when the rollers are turned to a neutral or non-turn indicating position, a blank space on the member 31 will register with the opening 17 and thus the device may serve as a tail light.

With the use of such a device, an accurate and visible signalling of the driver may always be effected and in such a manner as to relieve the driver from the inconveniences and danger resulting from removing his arm from the steering wheel for a prolonged length of time, lowering and raising a window through which the arm would be projected, and so forth.

While I have illustrated and described the preferred form of structure of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A vehicle signal of the class described, comprising: a housing having a front wall provided with an opening; a transparent closure for said opening; side walls in said housing; a pair of rollers, each journaled at its opposite end in said side walls, one of said rollers being positioned above and one below said opening; a gear fixedly mounted on each of said rollers at one end thereof; a shaft mounted in said housing and extending parallel to said rollers and positioned between the same; a gear fixedly mounted on said shaft and meshing at all times with both of the gears on said rollers; a bevel gear carried by said shaft; means engageable with said bevel gear for effecting a rotation of said rollers; and a flexible display member windable upon said rollers.

2. A vehicle signal of the class described, comprising: a housing having a front wall provided with an opening; a transparent closure for said opening; side walls in said housing; a pair of rollers, each journaled at its opposite end in said side walls, one of said rollers being positioned above and one below said opening; a gear fixedly mounted on each of said rollers at one end thereof; a shaft mounted in said housing and extending parallel to said rollers and positioned between the same; a gear fixedly mounted on said shaft and meshing at all times with both of the gears on said rollers; a bevel gear carried by said shaft; means engageable with said bevel gear for effecting a rotation of said rollers; and a flexible display member windable upon said rollers; and means for rotating said engageable means at will.

In testimony whereof I have signed the foregoing specification.

EUGENE MAUNZ.